Figure 1:
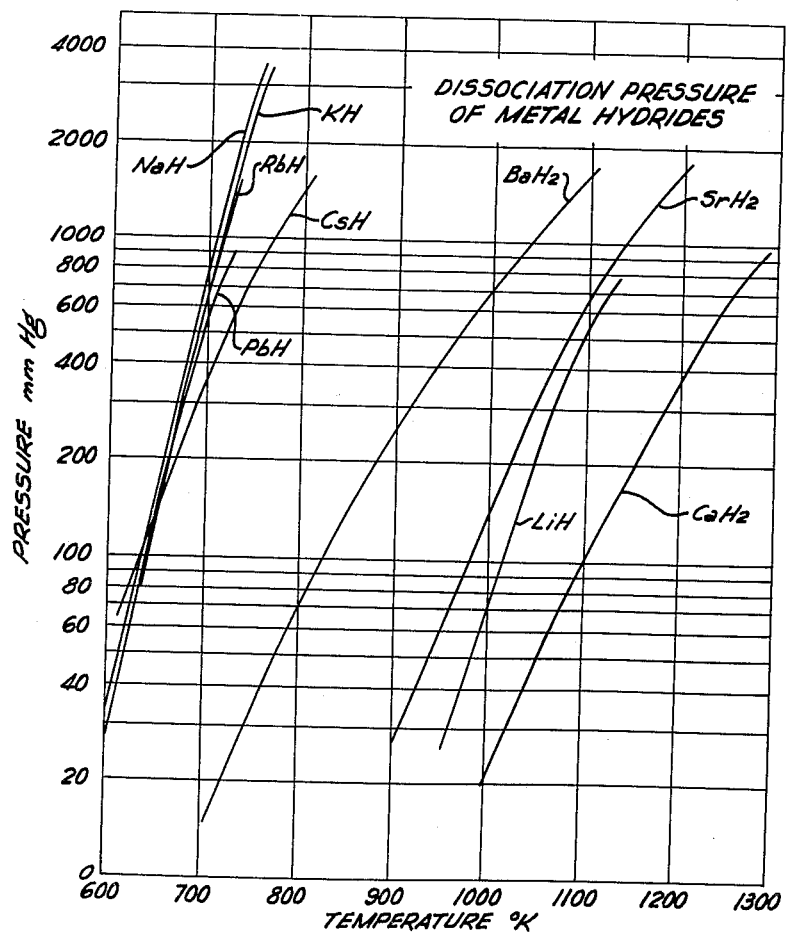

Dec. 19, 1961 T. A. CIARLARIELLO 3,014,084
SELF-CONTINUING HYDRIDE CELLS
Filed July 24, 1959

INVENTOR.
THOMAS A. CIARLARIELLO
BY
Brown, Critchlow, Flick & Peckham
ATTORNEYS

United States Patent Office 3,014,084
Patented Dec. 19, 1961

3,014,084
SELF-CONTINUING HYDRIDE CELLS
Thomas A. Ciarlariello, Evans City, Pa., assignor to MSA Research Corporation, Pittsburgh, Pa., a corporation of Pennsylvania
Filed July 24, 1959, Ser. No. 829,383
6 Claims. (Cl. 136—86)

The present invention relates to fuel cells which convert the free energy of formation of an ionizable alkali metal or an alkaline earth metal hydride into electrical power.

In the copending application of Werner and Shearer, Serial No. 754,555, filed August 12, 1958, which became abandoned after the filing, on July 24, 1959, of a continuation-in-part thereof, Serial No. 829,237, there is disclosed an invention in thermally regenerative galvanic cells. The cells in that application produce electric power upon the chemical formation of an ionizable hydride, for example an alkali metal or an alkaline earth metal hydride. Those cells are particularly advantageous in view of the facility with which the reacting species can be regenerated from the reaction products by thermal means. The present invention relates to an improvement in cells of that general nature.

In the ionic hydride fuel cells prepared heretofore, the cells convert the free energy of formation of the alkali and alkaline earth metal hydrides directly into electric power. The same concept is used in this invention. However, the prior cells require a heat source or an external source of gaseous hydrogen for operation. Initially, the hydrogen is supplied from an external source of gaseous hydrogen. Thereafter, the hydride resulting upon use of the cell may be decomposed into its elements and the resulting hydrogen be reused in the succeeding cycle of cell operation. For regeneration, an external source of heat obviously would be required.

In the present invention, operation of the cell once it has been initiated is continued without the need to supply either heat from an external source or to provide an external gas supply. This is accomplished in accordance with my discoveries by providing an auxiliary chamber containing a decomposable hydride in association with an ionic hydride cell. The metal hydride that is used in the auxiliary chamber is different from the hydride being formed in the hydride cell, and is characterized by (1) having a higher vapor pressure than the cell hydride and (2) by having a smaller heat of formation than the cell hydride. As the consequence of these requirements, the heat released upon formation of the ionic hydride in the cell serves, upon transference to the metal hydride in the auxiliary chamber, to generate the hydrogen reactant needed in the cell. The hydride in the auxiliary chamber has the lower heat of formation and the higher vapor pressure; accordingly, that hydride will decompose into its elements and the resulting gaseous hydrogen is conducted to the cell and there reacts with further quantities of the metal electrode, and the cycle thus continues until either the electrode or the metal hydride, or both, is consumed.

It is therefore apparent that after initiating the hydride forming reaction in the cell, further operation of the hydride cell is self-continuing and is limited, for practical purposes, solely by the relative quantities of the metal electrode used as well as the quantity of decomposable hydride placed in the auxiliary chamber.

From the considerations stated it is evident that upon establishing the hydride that is to be formed in generating power in the cell, it becomes possible to determine the hydrides that can be used in the auxiliary chamber. While the converse is equally true, it should be apparent that it is not possible to choose these hydrides independently of one another except by accident. The representative data in the following table and in the vapor pressure curve (FIG. 1) attached hereto provide information sufficient to make the proper choices of hydride to be formed and metal hydride that can be used therewith.

Table

| Hydride: | Heat of formation at 25° C., K Cal./mole $H_2$ |
|---|---|
| $CaH_2$ | 23.00 |
| $LiH$ | 21.39 |
| $SrH_2$ | 21.1 |
| $BaH_2$ | 20.4 |
| $KH$ | 14.45 |
| $NaH$ | 13.8 |
| $RbH$ | 12.0 |
| $CsH$ | 12 |

The series of hydrides given is but a partial list of hydrides that can be formed in the cell and that can be used in the auxiliary chamber. Any hydride mentioned in the table can be used in the auxiliary chamber when any other named hydride appearing at a higher point in the table is being formed in the cell, providing, of course, that the hydride used in the auxiliary chamber has the higher vapor pressure. While adjacent hydrides can be used, it is preferred that those chosen be widely spaced in the series of usable hydrides to take advantage of a greater difference in at least one of the critical characteristics.

The essential operation of the cell in this invention is the same as that disclosed in the Werner and Shearer patent application hereinbefore identified. In general, the hydride cell operates upon reaction of a cathode, hydrogen, with a metal electrode to form an ionizable metal hydride. Generally, alkali metal and alkaline earth metals are used as the metal anode. Many electrolytes that solubilize the ionic hydrides are available for use in these cells, with the alkali metal and alkaline earth metal halides being preferred. Electrolytes that are formed from mixtures of those halides, particularly eutectic mixtures, are desirable since they have a lower fusion point than the single salts and the electrolytes must be molten during operation. The cells are operated at temperatures at which the hydride-forming reaction occurs and the electrolyte used is molten.

Figure 2:
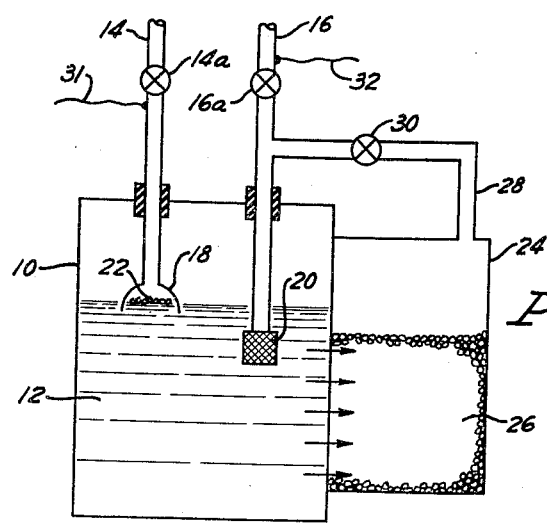

The invention will be described further in conjunction with the attached drawings in which, FIG. 1 is a graph showing the dissociation pressure of several metal hydrides as a function of temperature; and FIG. 2 shows, diagrammatically, one form of cell with an auxiliary chamber associated therewith, in which the present invention may be practiced.

The drawings will be described in connection with a specific example in which lithium hydride is formed in the cell and sodium hydride is used in the auxiliary chamber. It should be understood that other hydrides could be used as well, and that the invention is not to be limited by the details disclosed in the example.

Referring now to FIG. 2, the numeral 10 indicates a cell vessel that contains the electrolyte 12. While many electrolytes are suitable when the cell is operated to produce lithium hydride, alkali metal halides, or relatively low melting mixtures of such halides, e.g. lithium chloride and lithium fluoride, are particularly useful.

The cell vessel is provided with an anode holder 14 and a cathode holder 16. Each of the holders suitably is a tube, with the anode member 14 having an inverted cup 18 on its lower end while the cathode holder 16 terminates in a screen 20. At the cell operating conditions, the lithium anode 22 is molten, and the cup 18 serves to retain the lithium melt in contact with the electrolyte 12. Screen 20 helps disperse hydrogen gas at the cathode, to facilitate the reaction taking place at the cathode. Valves 14a and 16a are provided in electrode tubes 14 and 16, respectively, so that controlled access to the cell is maintained.

Shown in contact with one side of vessel 10 is an auxiliary chamber 24. While this chamber is shown side-by-side with the cell vessel 10, other configurations consistent with the object of securing efficient heat transfer may be used. For example, it is possible to make the auxiliary chamber in a manner to completely surround the side wall of vessel 10. This latter structure would be desirable where the efficiency of heat transfer becomes particularly significant. A quantity of sodium hydride 26 is placed in this auxiliary chamber 24.

In operation, hydrogen released from the sodium hydride passes to the cell vessel 24 through a conduit 28 that extends between the chamber 24 and the cathode holder 16. A check valve 30 in conduit 28 prevents back flow of gas from the cell vessel. Electrical leads 31 and 32 attached to the cathode and anode holders, respectively, complete the composite cell-chamber structure.

In producing power with a cell-chamber system as just described, an electrolyte 12, such as lithium chloride, is placed in the cell vessel 10 in an amount sufficient to come into contact with the anode cup 14 and the lower end of cathode holder tube 16. Accordingly, hydrogen entering through screen 20 will be dispersed into the lithium chloride and the anode, lithium, in the cup 18 will also be in contact with the electrolyte. When the lithium anode is in place in its cup, the cell is heated to the operating temperature, e.g. 1200° F., to melt the lithium and the electrolyte, lithium chloride. With the electrical leads 31 and 32 in the circuit that is to use the power produced, hydrogen is admitted to the cell 10 through cathode holder 16 to initiate the hydride-forming reaction in the cell. The overall cell reaction is:

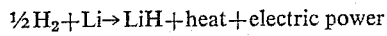

$$\tfrac{1}{2}H_2 + Li \rightarrow LiH + heat + electric\ power$$

The power is drawn into the circuit. The heat produced is transferred (as shown by the arrows in FIG. 2) to the molten sodium hydride 26, previously charged to the auxiliary chamber 24, through the common wall between the cell 10 and chamber 24. Sodium hydride as compared with lithium hydride conforms to the critical requirements hereinbefore stated; that is, it has the lower heat of formation and the higher vapor pressure. Accordingly, the heat produced in the cell is more than enough to cause decomposition of the sodium hydride, thereby releasing hydrogen. The hydrogen then passes through conduit 28 into the cell where it reacts resulting in more heat and power. After initiation of the cell reaction, all hydrogen requirements are supplied as a consequence of heat produced in the cell acting on the sodium hydride. Accordingly, the cell is self-continuing until the lithium metal or the sodium hydride is substantially depleted.

From the foregoing it is apparent that my discovery provides a convenient method of securing power from a fuel cell without need of external aids once the cell action has been initiated. This is particularly advantageous where space requirements are at a premium and supplies of gaseous hydrogen are not readily available. The invention can be used as a source of power in any conventional application, for example as a power source for an internal combustion engine or the like.

The transfer of heat produced in the cell to the auxiliary chamber is of primary importance in this invention. As will be apparent to those skilled in the art, other systems than the detailed embodiment designed to effect the requisite heat transfer can also be used. For example, the auxiliary chamber can be spaced away from the cell and the heat be transferred by use of an intermediate heat transfer fluid. For that practice, there may be interconnected coils located in the cell and in the chamber through which a heat exchange fluid circulates. That fluid would absorb heat in the cell and release it to the hydride in the auxiliary chamber.

It should also be understood that although cell operation was shown as being initiated by use of an external hydrogen supply, other means of initiation are possible. For example, hydrogen can be obtained by heating the hydride in the auxiliary chamber by use, at the initiation of cell operation, of an external heat supply. Thereafter, the heat requirements would be supplied by the exothermic reaction in the cell.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A self-continuing ionic hydride fuel cell comprising a cell vessel, a molten electrolyte in said vessel, an ionic hydride-forming metal electrode and a hydrogen electrode in contact with said electrolyte, an auxiliary chamber in indirect heat exchange relationship with electrolyte in said cell vessel, a metal hydride in said auxiliary chamber, said metal hydride (1) being different from the hydride of said metal electrode, (2) having a higher vapor pressure than said hydride of said metal electrode and (3) having a smaller heat of formation than said hydride of said metal electrode, and means to conduct hydrogen derived from said metal hydride in said auxiliary chamber to said hydrogen electrode.

2. A cell in accordance with claim 1 in which said metal hydride in said auxiliary chamber is selected from the group consisting of lithium hydride, strontium hydride, barium hydride, potassium hydride, sodium hydride, rubidium hydride and cesium hydride.

3. A cell in accordance with claim 2 in which said hydride-forming metal electrode is selected from the group consisting of calcium, lithium, strontium, barium, potassium, sodium and rubidium.

4. In a method of producing electric power in an ionic hydride fuel cell in which a hydride-forming metal electrode in contact with an electrolyte reacts with hydrogen to produce electric power, the improvement comprising providing a metal hydride in a zone in indirect heat exchange relationship with said cell, said metal hydride having a lower heat of formation and a higher vapor pressure than the hydride of said metal electrode, supplying hydrogen to said cell to initiate reaction and thereby produce heat and power, heating said metal hydride in said zone with heat released in said cell and introducing the resulting hydrogen into said cell to continue operation thereof.

5. A method in accordance with claim 4 in which said metal hydride in said auxiliary zone is selected from the group consisting of lithium hydride, strontium hydride, barium hydride, potassium hydride, sodium hydride, rubidium hydride and cesium hydride.

6. A method in accordance with claim 5 in which said hydride-forming metal electrode is selected from the group consisting of calcium, lithium, strontium, barium, potassium, sodium and rubidium.

References Cited in the file of this patent

UNITED STATES PATENTS 895,715     Bassett                Aug. 11, 1908

FOREIGN PATENTS

457         Great Britain            Jan. 13, 1885